United States Patent [19]

Matsumoto et al.

[11] Patent Number: 4,746,568
[45] Date of Patent: May 24, 1988

[54] HEAT-RESISTANT COATING COMPOSITION AND HEAT-RESISTANT COAT

[75] Inventors: Tooru Matsumoto, Asaka; Satoshi Ishikawa; Eiji Nakamura, both of Saitama; Tomio Izuoka, Nabari; Tomoyuki Okada, Tsu, all of Japan

[73] Assignees: Honda Giken Kogyo Kabushiki Kaisha, Tokyo; Mie Yushikako Kabushiki Kaisha, Nabari; Sankei Giken Kogyo Kabushiki Kaisha, Tokyo, all of Japan

[21] Appl. No.: 13,815

[22] Filed: Feb. 12, 1987

Related U.S. Application Data

[62] Division of Ser. No. 769,838, Aug. 27, 1985, Pat. No. 4,657,963.

[30] Foreign Application Priority Data

Aug. 28, 1984 [JP] Japan ................... 59-177544

[51] Int. Cl.$^4$ .................. B32B 19/02; B32B 33/00
[52] U.S. Cl. .................. 428/323; 427/270; 428/328; 428/418; 428/447; 428/448; 428/450
[58] Field of Search ............... 428/447, 448, 450, 545, 428/625, 323, 328, 418

[56] References Cited

U.S. PATENT DOCUMENTS

| | | | |
|---|---|---|---|
| 3,477,869 | 11/1969 | Butter et al. | 428/447 |
| 3,936,583 | 2/1976 | Lloyd et al. | 428/450 |
| 3,997,501 | 12/1976 | McLeod | 524/439 |
| 4,487,815 | 12/1984 | Dorsett et al. | 428/450 |

FOREIGN PATENT DOCUMENTS 0134912 3/1985 European Pat. Off. .

OTHER PUBLICATIONS

Patent Abstracts of Japan, vol. 1, No. 191 (C-182) [1336], Aug. 20, 1983.
Patent Abstracts of Japan, vol. 5, No. 58 (C-51) [730], Apr. 21, 1981.
Chemical Abstracts, vol. 90, No. 8, Abstract No. 56385e, Feb. 19, 1979.
Chemical Abstracts, vol. 89, Abstract No. 199172y, Dec. 1978.

*Primary Examiner*—Allan M. Lieberman
*Attorney, Agent, or Firm*—Armstrong, Nikaido, Marmelstein & Kubovcik

[57] ABSTRACT

A heat-resisting coating composition prepared by binding with a mixture of modified silicone resin and an aluminum chelate compound, pulverized inorganic material consisting essentially of a mixture of powder containing at least one member selected from the group consisting of aluminum phosphate, zinc molybdate and calcium carbonate, plate-shaped powder principally containing aluminum silicate or magnesium silicate, and metallic zinc powder. The composition exhibits excellent rust-preventing performance in a temperature range spreading from a low temperature to a high temperature, as a heat-resisting painting material for use on an exhaust pipe connected with a motor car engine. Upon applying said heat-resisting coating composition onto a metal surface, it is effective for enhancing adhesion to preliminarily form fine protrusions having "turn-rounds" on the metal surface.

3 Claims, 6 Drawing Sheets $\overline{10\mu}$ $\overline{10\mu}$ (Held at each temperature for 200 hours)

( Held each temperature for 200 hours )

( Held each temperature for 200 hours )

HEAT-RESISTANT COATING COMPOSITION AND HEAT-RESISTANT COAT

This is a division of application Ser. No. 769,838 filed Aug. 27, 1985 and now U.S. Pat. No. 4,657,963.

BACKGROUND OF THE INVENTION

1. Field of the Invention

The present invention relates to a heat-resistant coating composition and a heat-resistant coat making use of said composition, and more particularly to a heat-resistant coating composition and a coat consisting of said composition which has stable rust-proofness even after it has been exposed to any temperature within a temperature range of $-50°$ C.–$650°$ C. for a long period.

2. Description of the Prior Art

Recently, speed-up of the rotational speed of an engine and reduction of the weight and the size of an exhaust pipe in a motor-cycle, a motor tricycle, a motor car, etc. have advanced, and the surface temperature of an exhaust pipe has become high as compared to that in the prior art to such extent that it exceeds the limit temperature of $550°$ C. of the heat-resistant rust-preventing paint used in the prior art and reaches $650°$ C.

An exhaust pipe of a motor car engine is composed of an exhaust pipe section connected to an exhaust manifold or directly to cylinder heads and a muffler (silencer); the closer a portion of the exhaust pipe is located to the engine, the larger temperature change to which said portion is exposed, and at the rear end portion of the muffler which is remote from the engine, the temperature change is $100°$ C. or lower. The condition of use of the exhaust pipe section close to the engine is especially severe, in a cold district it is used in the temperature range of, for instance, from an atmospheric temperature $-30°$ C. to about $650°$ C. upon high speed rotation of the engine, and moreover, upon starting of the engine the temperature rises at a rate of about $600°$ C. per minute and reaches the highest temperature after only about 70 seconds.

In addition, during running of a vehicle, pebbles, sand, mud, water, etc. splashed by wheels would collide with the surface of the exhaust pipe, hence an impact force or a thermal impact would act upon the surface, while during stoppage of the vehicle, the exhaust pipe is exposed to a corrosive environment caused by rain water, salty water or dew water produced at night, and so, corrosion of the exhaust pipe proceeds.

Heretofore, as a heat-resisting coating material for protecting an exhaust pipe, a silicone series heat-resisting paint has been used, and the composition of the paint consists principally of silicone resin or modified silicone resin, metallic zinc and inorganic pigment. A metal surface to which this composition is to be applied, is preliminarily roughened by subjecting it to a shot blast treatment, the above-mentioned composition is applied on the roughened surface to form a lower layer, then a composition consisting of silicone resin, metal oxides and inorganic pigment is superposed thereon, and thereby a heat-resisting coat is formed.

The principle of rust-prevention by means of this heat-resisting coat is such that in the low temperature range, invasion of water and salts which act as corrosive media to the surface of metal is prevented by the coat, and after heating, it is aimed to realize a sacrificial anodic effect of metallic zinc making use of a potential difference between the base metal and zinc. In the case of the heat-resisting coat in the prior art, there exists a temperature range where either of the above-mentioned rust-preventing effects appears poorly, and more particularly, a rust-prevention power after heated in the temperative range of $200°$ C.–$300°$ C. is poor, and so, on the practically used exhaust pipe, often rust was produced at an early time.

As a result of seeking for the cause of the above-mentioned defects, the following has been clarified:

① Even under the condition that the lower layer coating material has been heated up to $380°$ C., metallic zinc particles contained therein are wrapped by carbide coating films of resin, hence assembled cracks (See FIG. 1) would appear while the rust-preventing effect relying upon the sacrificial anode does not appear, and so, a shielding effect for the corrosive media is lost.

② The thickness of the coat is $60\mu$ or less, and so, in the case where the height of the protrusions formed on the metal surface by the roughening treatment exceeds $40\mu$, the thickness of the coating layer covering the protruded portions is remarkably reduced, hence the top portions of the protrusions are apt to be exposed, and thus rusting is promoted.

SUMMARY OF THE INVENTION

A principal object of the present invention is to provide a heat-resisting coating composition which does not produce assembled cracks even when it is heated, in which a sacrificial anodic effect relying upon metallic zinc can be fully achieved, and which has an excellent rust-preventing property.

Another object of the present invention is to provide a heat-resisting coat which is applied on a surface of metal subjected to a special surface roughening treatment, which is hard to be peeled off and which has an excellent rust-preventing property.

Characteristic features of the present invention will become more apparent from perusal of the following detailed description of the invention with reference to the accompanying drawings.

BRIEF DESCRIPTION OF THE INVENTION

DETAILED DESCRIPTION OF THE INVENTION

The heat-resisting coating composition according to the present invention comprises pulverized inorganic material consisting essentially of a mixture of powder containing at least one compound selected from the group consisting of aluminium phosphate, zinc molybdate and calcium carbonate, plate shaped powder particles consisting mostly of aluminium silicate or magnesium silicate, and metallic zinc powder, which inorganic material is bound by modified silicone resin to which an aluminium chelate compound has been added. In this composition, a network of cracks is not generated even when the composition is heated. The strain caused by heating is dispersed among the particles of the powder, resulting in exposure of the surface of metallic zinc in the pulverized inorganic material, hence a sacrificial anodic effect can be revealed, and also invasion of water and salts which act as corrosive media can be surely prevented.

Figure 1:
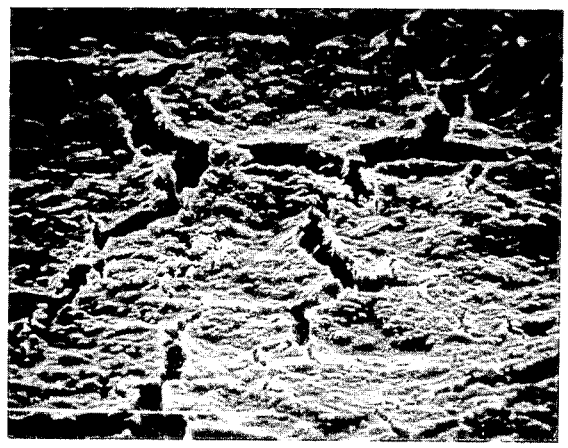
FIG. 1 is a photograph showing the state where cracks have been produced by heating a publicly known heat-resisting coat containing particles of inorganic material powder.

When a mixture of silicone resin or modified silicone resin and powder of an inorganic material (a mixture used in the prior art) is coated on a metal surface and is heated, the organic groups which are on the side of the Si-O-Si chain in the silicone resin and modified resin are oxidized and escape in the form of gas, leaving residual carbon, and so, at a high temperature the particles of the inorganic material are bound with carbon in the coating film formed by the Si-O-Si chain. In this coating film, there are numerous networks of cracks (See FIG. 1), and hence corrosive media would easily invade the metal surface.

According to the present invention, such problems in the prior art have been resolved by employing an aluminium chelate compound as a resin binder, and by employing plate-shaped powder particles as a component of the inorganic material. The plate-shaped powder particles result from cleavage along a plane in the crystal structure of a mineral.

A preferable compounding ratio of the heat-resistant coating composition according to the present invention is as follows:

① modified silicone resin+aluminium chelate compound—20-50 weight %

$$\left( \begin{array}{c} \text{It is to be noted that [aluminium} \\ \text{chelate compound/(modified silicone} \\ \text{resin + aluminium chelate compound)]} \\ \times 100 = 0.5 \sim 4 \text{ weight \%}. \end{array} \right)$$

② pulverized inorganic material—50-80 weight %

Figure 2:
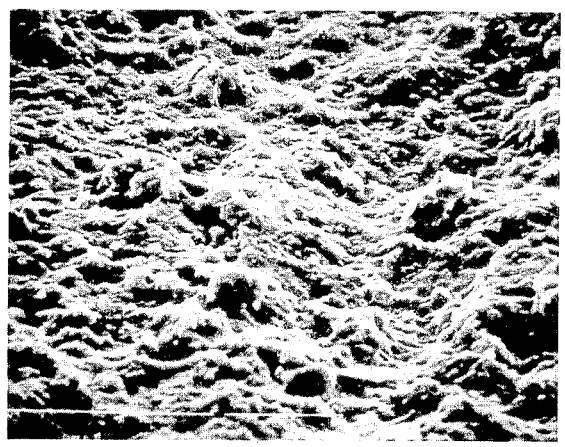
FIG. 2 is a photograph showing the state where particles of a pulverized inorganic material are exposed by heating a heat-resisting coat according to the present invention.

In order to improve the shielding effect (the effect of preventing invasion of corrosive media) of silicone resin, it is favorable that any one of phenol resin, epoxy resin, acrylic resin and polyester resin or a mixture of them (called modified resin) be present in the silicone resin to the extent 20-40 weight % (this being called modified silicone resin) and to add an aluminium chelate compound thereto. For this aluminium chelate compound, ethylacetate aluminium di-isoprolylate or aluminium tris-ethylacetoacetate is favourable. The aluminium chelate compound functions as a catalyst for inter-molecule bonding in the resin, and it has the effect that by reducing the presence of unbonded molecules thermal decomposition loss is decreased and strength is improved, resulting in reduction of the network of cracks over the surface of the pulverized inorganic material (See FIG. 2). Also, the addition of modified resin to silicone resin is for the purpose of reinforcing adhesion when the composition is heated up to 350° C.–450° C. and giving it basic strength to reduce particle surface cracks.

Furthermore, in order to reinforce rust-preventing power in the case where the heat-resisting coating composition is heated up to 200° C.–400° C., it is necessary that any one of aluminium phosphate, zinc molybdate and calcium carbonate or a mixture of them be present in the pulverized inorganic material to the extent of 20–55 weight %, and also it is desirable that the plate-shaped powder particles be present in the pulverized inorganic material to the extent of 2–30 weight %. As these plate-shaped powder particles, mica powder principally consisting of aluminium silicate or talc principally consisting of magnesium silicate are effective, and these powders form a layer overlapping with other powder particles in the bonded coating composition. This layer has an excellent shielding effect and a capability of preventing a network of cracks.

In addition, with regard to the metallic zinc powder to be used as a sacrificial anode, it is necessary that it be present to the extent of 40–70 weight % in the above-described pulverized inorganic material and preferrably 20–56 weight % in the coating composition.

Figure 3:
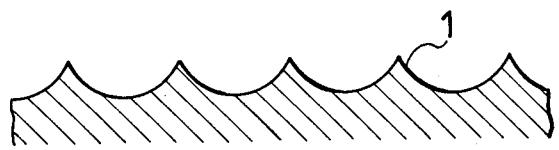
FIG. 3 is a cross-section view of a metal surface portion attained through a surface roughening treatment in the prior art.
Figure 4:
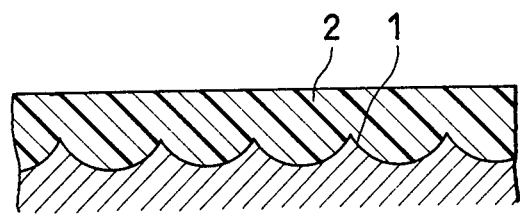
FIG. 4 is a cross-section view showing the state where a heat-resisting coat has been applied onto the metal surface shown in FIG. 3.

On the other hand, the condition of the metal surface on which the above-mentioned heat-resisting coating composition is to be applied is also important. Heretofore, as a method for roughening a metal surface, a shot-blast process and a sand blast process have been employed, and on the surface of metal treated through these processes are formed protrusions 1 having a cross-section configuration as shown in FIG. 3. In the case of such a surface, since the difference in height between a protruded portion and the recessed portion is large, the thickness of a coat applied to the recessed portion is large, but that applied to the protruded portion is small, resulting in lowering of rust-preventing power, and even if the protrusions and recesses are formed finely, as the shape of the protrusions 1 is a simple spike type, adhesion of the coat is weak and it is apt to be peeled off when it is heated up to a high temperature (See FIG. 4. In this figure, refference numeral 2 designates a coat.).

Figure 5:
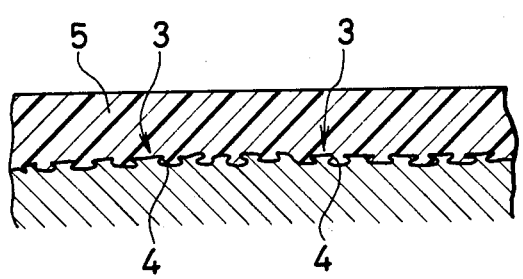
FIG. 5 is a cross-section view showing the state where a heat-resisting coat has been applied onto a metal surface attained through a surface roughening treatment relevant to the present invention.

In order to obviate such shortcomings, according to the present invention, fine protrusions 3 having "turn-rounds" (overhanging portions) 4 are formed on the surface of metal so as to improve adhesion of the coat 5 (FIG. 5). Since the protrusion 3 is formed as bent into the recessed portion by collapsing a tip portion of a simple spike-shaped protrusion and thus has a small height and a "turn-round" 4, an excellent heat-resisting power and an excellent high-temperature adhesion can be provided. In contrast to the fact that in the case of the metal surface configuration as shown in FIG. 3, even if the base metal is stainless steel or nickel plating having little tendency for thermal oxidation, a coat would peel off when heated up to 550° C. or higher, a coat applied to base metal having a group of fine protrusions with "turn-rounds" 4 formed thereon would not peel off even if it is heated up to 650° C. for a long period of time.

For forming such protrusions 3 on the surface of metal, it is sufficient to form fine protrusions and recesses on the metal surface by blasting metal particles, alumina particles, sand particles or the like having sharp corners and a diameter of 0.3 mm or less (particles which are called "grit") onto the metal surface with a high pressure by means of a blasting machine (for example, that of rotary blade type or compressed air type), and then collapsing the tip ends of the already formed fine protrusions by blasting spherical particles or rectangular particles of glass, metal or the like having a diameter of 0.3 mm or less with an extremely low pressure (See Example VIII).

Now, examples of tests conducted to confirm the effects and advantages of the present invention will be set forth. It is to be noted that in the respective tables attached to this specification and in the foot notes of the tables, numerals (1)*, (2)*, . . . (9)* are added for the purpose of clarifying names of the materials used and their compounding proportions, and operation processes for the tests. The explanation for the respective numerals are given in Table-16.

EXAMPLE I

With respect to Samples 1-1, 1-2, . . . , 1-5 for which compounding proportions of aluminium chelate compound, silicone resin, modified resin and pulverized inorganic materials are varied, the heat-resisting adhesivness and the heat-resisting rust-proofness were investigated. The compounding proportions are shown in Table-1, and the test results are shown in Table 2. According to the respective tables, the heat-resisting adhesiveness and the heat-resisting rust-proofness of the heat-resisting coat are excellent when the proportion of modified resin contained in modified silicone resin consisting of silicone resin and modified resin falls in the range of 20–40 weight %.

EXAMPLE II

With respect to respective Samples 2-1, 2-2, . . . , 2-5, the heat-resisting adhesiveness and the heat-resisting rust-proofness were investigated. The compounding proportions are shown in Table-3, and the test results are shown in Table-4. According to the respective tables, the heat-resisting adhesiveness and the heat-resisting rust-proofness of the heat-resisting coat are excellent when the proportion of pulverized inorganic material contained in the coat is 50–80 weight %, or when the proportion of "modified silicone resin+aluminium chelate compound" contained in the coat is 20–50 weight %.

EXAMPLE III

With respect to respective Samples 3-1, 3-2, . . . , 3-6, the heat-resisting adhesiveness and the heat-resisting rust-proofness were investigated. The compounding proportions are shown in Table-5, and the test results are shown in Table-6. According to the respective tables, the heat-resisting adhesiveness and the heat-resisting rust-proofness of the heat-resisting coat are excellent when the proportion of aluminium chelate compound relative to the mixture of aluminium chelate compound and modified silicone resin falls in the range of 0.5–4 weight %.

EXAMPLE IV

With respect to respective Samples 4-1, 4-2, . . . , 4-6, the heat-resisting adhesiveness and the heat-resisting rust-proofness were investigated. The compounding proportions are shown in Table-7, and the test results are shown in Table-8. According to the respective tables, the heat-resisting adhesiveness and the heat-resisting rust-proofness of the heat-resisting coat are excellent when the proportion of metallic zinc powder contained in the pulverized inorganic material (zinc molybdate+cleaving scale-shaped powder+metallic zinc powder) is 40–70 weight %.

EXAMPLE V

With respect to respective Samples 5-1, 5-2, . . . , 5-6, the heat-resisting adhesiveness and the heat-resisting rust-proofness were investigated. The compounding proportions are shown in Table-9, and the test results are shown in Table 10. According to the respective tables, the heat-resisting adhesiveness and the heat-resisting rust-proofness of the heat-resisting coat are excellent when the proportion of plate-shaped powder particles (mica+talc) contained in the pulverized inorganic material (zinc molybdate+metallic zinc powder+plate-shaped powder) particles is 2–30 weight %.

EXAMPLE VI

With respect to respective Samples 6-1, 6-2, . . . , 6-5, the heat-resisting adhesiveness and the heat-resisting rust-proofness were investigated. The compounding proportions are shown in Table-11, and the test results are shown in Table-12. According to the respective tables, the heat-resisting adhesiveness and the heat-resisting rust-proofness of the heat-resisting coat are excellent when the proportion of zinc molybdate contained in the pulverized inorganic material (zinc molybdate+metallic zinc powder+plate-shaped powder) particles is 20–50 weight %.

EXAMPLE VII

Samples A, B, C and D have the resin component in the coat varied, Samples A and C employ modified silicone resin, and especially in Sample A the resin component is added with aluminium chelate compound. In addition, in Samples A-1, B-1, C-1, and D-1, in place of silica which is an inorganic material component in Samples A, B, C and D, respectively, "silica+zinc powder" is used. Furthermore, in Samples A-2, B-2, C-2 and D-2, the silica contents in Samples A-1, B-1, C-1 and D-1 are reduced, and condensed aluminium phosphate, zinc molybdate and calcium carbonate are added in place of them. In Samples A-3, B-3, C-3 and D-3, the silica contents in Samples A-2, B-2, C-2 and D-2 are reduced, and mica and talc are added in place of them.

The compounding proportions of these samples are shown in Table-13 and Table-14, and the test results for the heat-resisting corrosion-proofness of the respective Samples A . . . D, A-1 . . . D-1, A-2 . . . D-2, and A-3 . . . D-3 are shown, respectively, in FIGS. 6, 7, 8 and 9.

Figure 6:
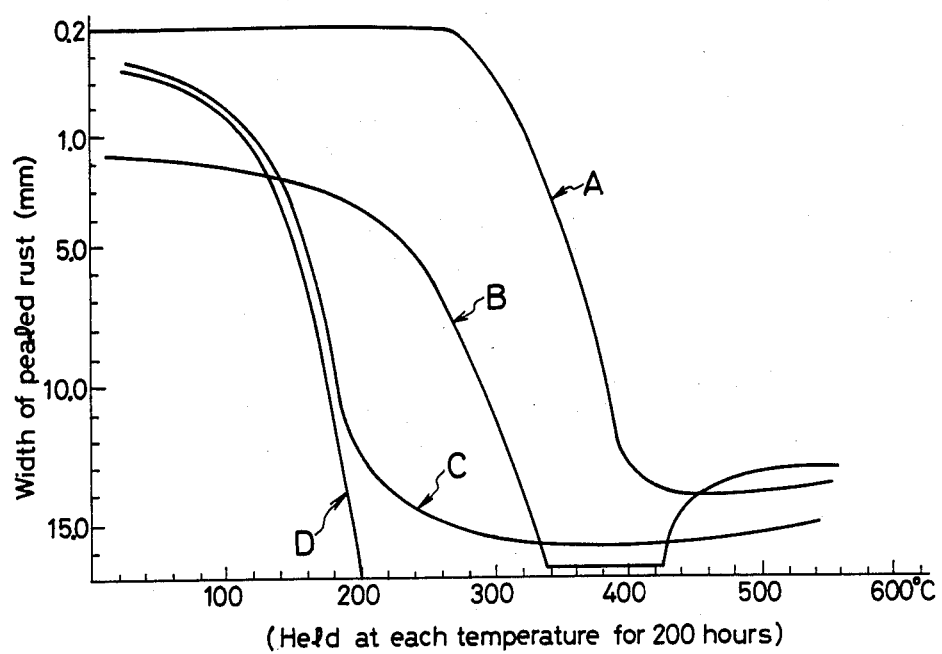
FIGS. 6 to 9 are comparative diagrams showing the effects of heat-resisting coats according to the present invention.
Figure 7:
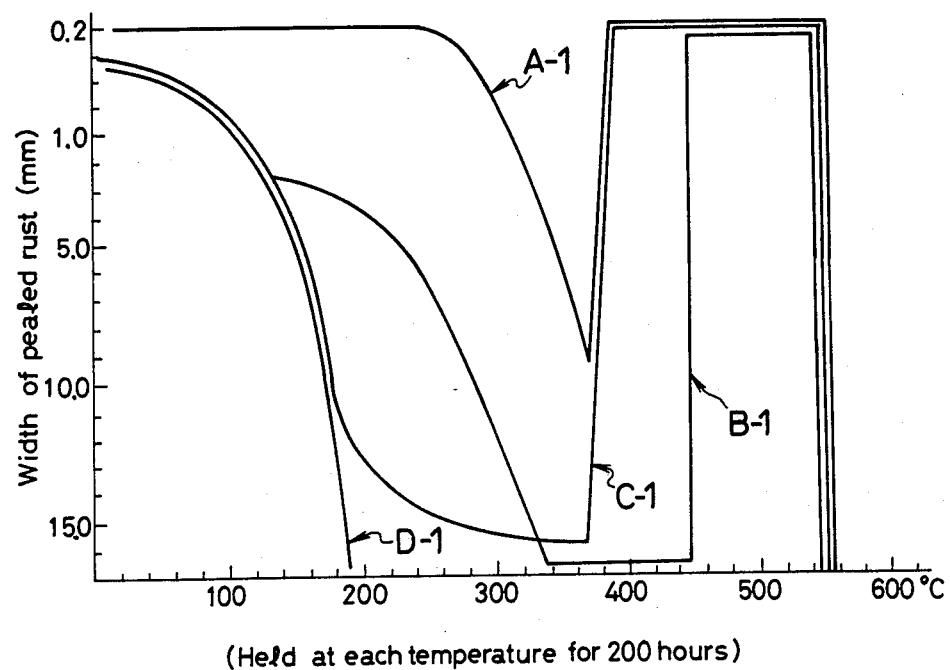
Figure 8:
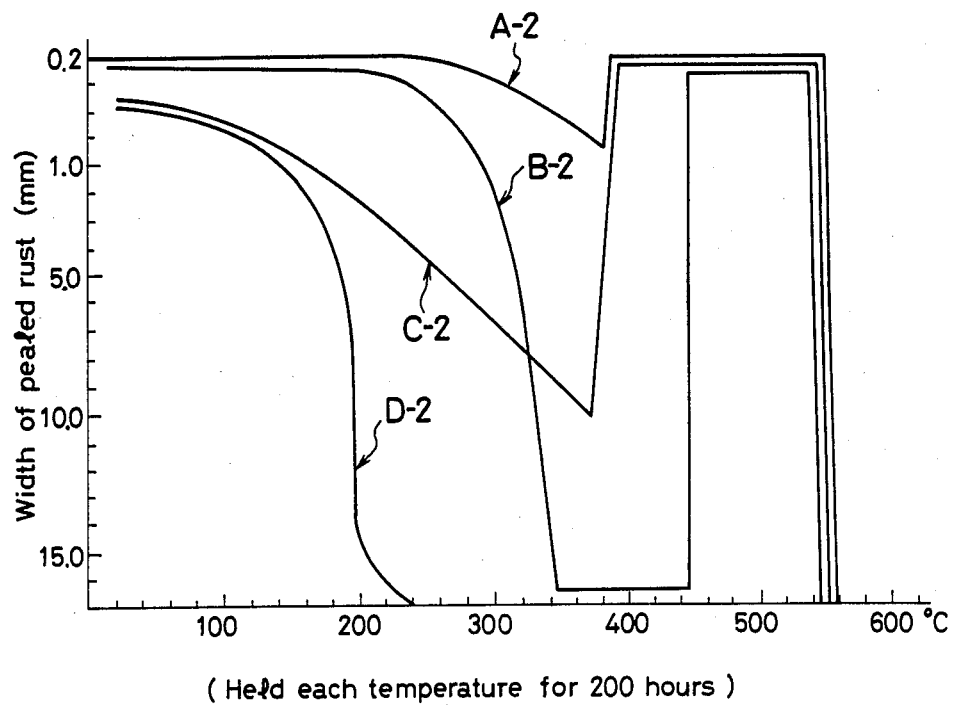
Figure 9:
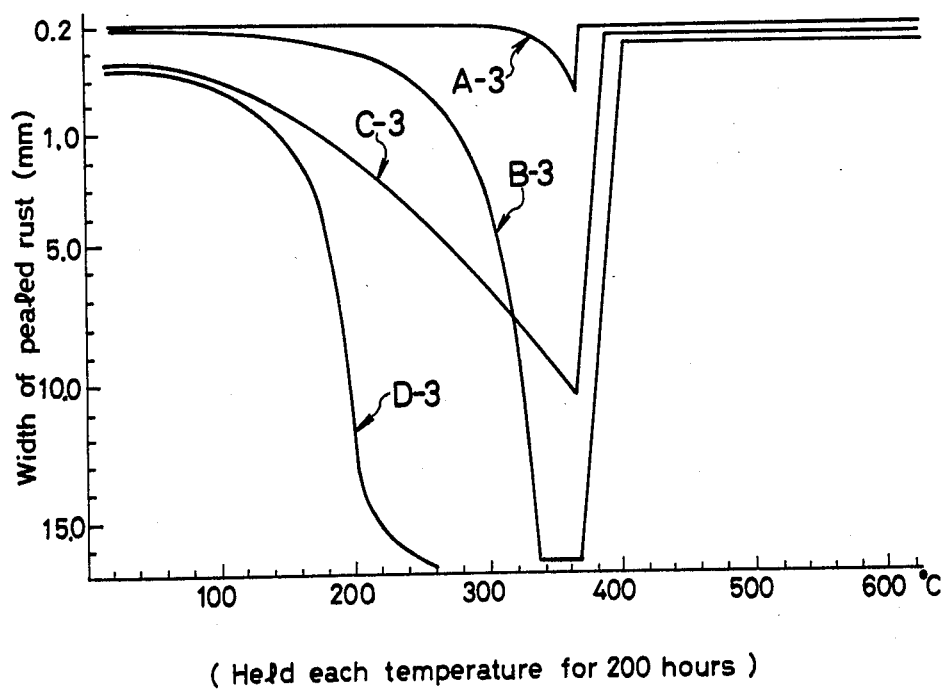

With reference to FIG. 6, it can be seen that the rust-preventing power of modified silicone resin to which an aluminium chelate compound is added is excellent. In addition, with reference to FIG. 7, it can be seen that the corrosion-proofness at a high temperature can be improved by adding zinc powder, and in the case of Samples A-1 and C-1 in which zinc powder is added to modified silicone resin, the rust-preventing effect relying upon zinc appears at a temperature that is lower by about 60° C. as compared to Sample B-1 in which zinc powder is added to silicone resin. Furthermore, with reference to FIG. 8, it is seen that the effects of condensed aluminium phosphate, zinc molybdate and calcium carbonate appear at 200° C.–400° C., and with reference to FIG. 9, it can be seen that plate-shaped powder particles (mica powder and talc) improve the rust-preventing power at 300° C.–400° C.

EXAMPLE VIII

With respect to a heat-resisting coating film in the prior art and a coat according to the present invention, respectively, tests for the rust-preventing power and the adhesiveness were conducted while varying the conditions (roughness) of the base metal surface. Here it is to be noted that the above-referred "heat-resisting coating film in the prior art" means a coating film including, as a lower layer, a composition consisting of 30 wt.% silicone resin, 8 wt.% condensed aluminium phosphate, 8 wt.% zinc molybdate, 8 wt.% calcium carbonate, 35 wt.% zinc powder and 11 wt.% silica and another composition superposed thereon consisting of 26.3 wt.% silicone resin, 28.1 wt.% metal oxides, 19.3 wt.% silica and 26.3 wt.% talc, and that the above-referred "coat according to the present invention" means a coating film including, as a lower layer, a composition consisting of 20.4 wt.% silicone resin, 2.6 wt.% epoxy resin, 1.7 wt.% acrylic resin, 2.6 wt.% phenol resin, 1.7 wt.% polyester resin, 1 wt.% aluminium chelate compound, 8 wt.% condensed aluminium phosphate, 8 wt.% zinc molybdate, 8 wt.% calcium carbonate, 3 wt.% mica powder, 3 wt% talc, 35 wt.% zinc powder and 5 wt.% silica, and another composition superposed thereon consisting of 26.3 wt.% silicone resin, 28.1 wt.% metal oxides, 19.3 wt.% silica and 26.3 wt.% talc. According to Table-15 which shows the results of these tests, it can be seen that only the test No. 8-6 is satisfactory with respect to the rust-preventing power on the surface of iron and the adhesiveness (at 650° C.) to the nickel-plated surface. Accordingly, an exhaust pipe with a heat-resisting coat that is excellent in heat-resisting corrosion-proofness and is cheap, can be provided by employing nickel-plated base material in the exhaust pipe section close to the engine and employing iron in the muffer section.

As will be apparent from the above description, in the heat-resisting coat according to the present invention, a network of cracks would not be produced by heating, the surface of the metallic zinc particles in the pulverized inorganic material can be easily exposed, resulting in a sacrificial anodic effect, and invasion of corrosive media can be surely prevented. Moreover, the same heat-resisting coat applied onto a base metal surface provided with a group of fine protrusions having "turnrounds" would hardly peel off even at a high temperature and thus reveals excellent corrosion proofness.

TABLE 1

| | (Compounding Proportions) | | | | | |
|---|---|---|---|---|---|---|
| Sample | | 1-1 | 1-2 | 1-3 | 1-4 | 1-5 |
| components | aluminium chelate (1)* | 0.4 | 0.4 | 0.4 | 0.4 | 0.4 |
| | silicone resin | 34 | 32 | 28 | 24 | 22 |
| | modified resin (2)* | 6 | 8 | 12 | 16 | 18 |
| | pulverized inorganic material (4)* | 60 | 60 | 60 | 60 | 60 |
| Content of modified resin $\left(\dfrac{\text{modified resin}}{\text{silicone resin + modified resin}} \times 100\right)$ | | 15% | 20 | 30 | 40 | 45 |
| | Total | 100.4 | 100.4 | 100.4 | 100.4 | 100.4 |

The above components are dispersed through the process (5)* and then applied through the process (6)* to form a coat.

TABLE 2

| (Test Results) | | | | | |
|---|---|---|---|---|---|
| | Sample | | | | |
| Test Item | 1-1 | 1-2 | 1-3 | 1-4 | 1-5 |
| Heat-resisting adhesiveness (8)* | x | O | O | O | x |
| Heat-resisting rust-proofness (9)* | x | O | O | O | x |

The test was conducted with respect to the respective ones of the coats which had been heated through the process (7)*

TABLE 3

| | (Compounding Proportions) | | | | | |
|---|---|---|---|---|---|---|
| Sample | | 2-1 | 2-2 | 2-3 | 2-4 | 2-5 |
| Components | pulverized inorganic material (4)* | 90 | 80 | 70 | 50 | 40 |
| | modified silicone resin (3)* | 9.9 | 19.8 | 29.7 | 49.5 | 59.4 |
| | aluminium chelate (1)* | 0.1 | 0.2 | 0.3 | 0.5 | 0.6 |
| Content of pulverized inorganic material | | 90% | 80 | 70 | 50 | 40 |
| Total | | 100.0 | 100.0 | 100.0 | 100.0 | 100.0 |

The above components are dispersed through the process (5)* and then applied through the process (6)* to form a coat.

TABLE 4

| (Test Results) | | | | | |
|---|---|---|---|---|---|
| | Sample | | | | |
| Test Item | 2-1 | 2-2 | 2-3 | 2-4 | 2-5 |
| Heat-resisting adhesiveness (8)* | x | O | O | O | x |
| Heat-resisting rust-proofness (9)* | x | O | O | O | x |

The test was conducted with respect to the respective ones of the coats which had been heated through the process (7)*.

TABLE 5

| | (Compounding Proportions) | | | | | | |
|---|---|---|---|---|---|---|---|
| Sample | | 3-1 | 3-2 | 3-3 | 3-4 | 3-5 | 3-6 |
| Components | aluminium chelate (1)* | 0.2 | 0.5 | 1.0 | 3 | 4 | 4.5 |
| | modified silicone resin (3)* | 99.8 | 99.5 | 99.0 | 97 | 96 | 95.5 |
| | pulverized inorganic material (4)* | 233 | 233 | 233 | 233 | 233 | 233 |

TABLE 5-continued (Compounding Proportions)

| Sample | | 3-1 | 3-2 | 3-3 | 3-4 | 3-5 | 3-6 |
|---|---|---|---|---|---|---|---|
| Content of aluminium chelate $\left(\dfrac{\text{aluminum chelate}}{\text{aluminium chelate} + \text{modified silicone resin}}\right) \times 100$ | 0.2% | 0.5 | 1.0 | 3 | 4 | 4.5 |
| Total | 333 | 333 | 333 | 333 | 333 | 333 |

The above contents are dispersed through the process (5)* and then applied through the process (6)* to form a coat.

TABLE 6

(Test-Results)

| | Sample | | | | | |
|---|---|---|---|---|---|---|
| Test Item | 3-1 | 3-2 | 3-3 | 3-4 | 3-5 | 3-6 |
| Heat-resisting adhesiveness (8)* | o | o | o | o | o | x |
| Heat-resisting rust-proofness (9)* | x | o | o | o | o | o |

The test was conducted with respect to the respective ones of the coats which had been heated through the process (7)*.

TABLE 7

(Compounding Proportions)

| Sample | | 4-1 | 4-2 | 4-3 | 4-4 | 4-5 | 4-6 |
|---|---|---|---|---|---|---|---|
| Components | zinc molybdate | 50 | 48 | 40 | 32 | 24 | 20 |
| | plate-shaped powder | 15 | 12 | 10 | 8 | 6 | 5 |
| | metallic zinc powder | 35 | 40 | 50 | 60 | 70 | 75 |
| | modified silicone resin (3)* | 43 | 41 | 38 | 34 | 31 | 29 |
| | aluminium chelate (1)* | 0.43 | 0.41 | 0.38 | 0.34 | 0.38 | 0.29 |
| Content of metallic zinc powder* | | 35% | 40 | 50 | 60 | 70 | 75 |
| Total | | 143.43 | 141.41 | 138.38 | 134.34 | 131.38 | 129.29 |

The above components are dispersed through the process (5)* and then applied through the process (6)* to form a coat.

*content of metallic zinc powder =

$$\dfrac{\text{metallic zinc powder}}{\text{metallic zinc powder} + \text{zinc molybdate} + \text{plate-shaped powder}} \times 100$$

TABLE 8

(Test Results)

| | Sample | | | | | |
|---|---|---|---|---|---|---|
| Test Item | 4-1 | 4-2 | 4-3 | 4-4 | 4-5 | 4-6 |
| Heat-resisting adhesiveness (8)* | o | o | o | o | o | o |
| Heat-resisting rust-proofness (9)* | x | o | o | o | o | x |

The test was conducted with respect to the respective ones of the coats which had been heated through the process (7)*

TABLE 9

(Compounding Proportions)

| Sample | | 5-1 | 5-2 | 5-3 | 5-4 | 5-5 | 5-6 |
|---|---|---|---|---|---|---|---|
| Components | zinc molybdate | 33 | 33 | 30 | 27 | 23 | 22 |
| | metallic zinc powder | 66 | 65 | 60 | 53 | 47 | 43 |
| | cleaving scale-shaped powder | 1 | 2 | 10 | 20 | 30 | 35 |
| | modified silicone resin (3)* | 31 | 32 | 35 | 39 | 42 | 45 |
| | aluminium chelate (1)* | 0.3 | 0.3 | 0.4 | 0.4 | 0.4 | 0.5 |
| Content of plate-shaped powder* | | 1% | 2 | 10 | 20 | 30 | 35 |
| Total | | 131.3 | 132.3 | 135.4 | 139.4 | 142.4 | 145.5 |

The above components are dispersed through the process (5)* and then applied through the process (6)* to form a coat.

*content of cleaving scale-shaped powder =

$$\dfrac{\text{cleaving scale-shaped powder}}{\text{cleaving scale-shaped powder} + \text{zinc molybdate} + \text{metallic zinc powder}} \times 100$$

TABLE 10

(Test Results)

| | Sample | | | | | |
|---|---|---|---|---|---|---|
| Test Item | 5-1 | 5-2 | 5-3 | 5-4 | 5-5 | 5-6 |
| Heat-resisting adhesiveness (8)* | x | o | o | o | o | o |
| Heat-resisting rust-proofness (9)* | x | o | o | o | o | x |

The test was conducted with respect to the respective ones of the coats which had been heated through the process (7)*.

TABLE 11

| Sample | (Compounding Proportions) | | | | | |
|---|---|---|---|---|---|---|
| | | 6-1 | 6-2 | 6-3 | 6-4 | 6-5 |
| Components | zinc molybdate | 15 | 20 | 30 | 50 | 55 |
| | metallic zinc powder | 44 | 60 | 52 | 37 | 34 |
| | plate-shaped powder | 21 | 20 | 18 | 13 | 11 |
| | modified silicone resin (3)* | 32 | 37 | 39 | 42 | 42 |
| | aluminium chelate (1)* | 0.3 | 0.4 | 0.4 | 0.4 | 0.4 |
| Content of zinc molybdate | | 15% | 20 | 30 | 50 | 55 |
| Total | | 132.3 | 137.4 | 139.4 | 142.4 | 142.4 |

The above components are dispersed through the process (5)* and then applied through the process (6)* to form a coat.

The test was conducted with respect to the respective ones of the coats which had been heated through the process (7)*.

TABLE 13

| | (Compounding Proportions) | | | | | | | |
|---|---|---|---|---|---|---|---|---|
| | Sample | | | | | | | |
| Components | A | B | C | D | A-1 | B-1 | C-1 | D-1 |
| modified resin (2)* | — | — | — | 30 | — | — | — | 30 |
| silicone resin | — | 30 | — | — | — | 30 | — | — |
| modified silicone resin (3)* | 29 | — | 30 | — | 29 | — | 30 | — |
| aluminium chelate (1)* | 1 | — | — | — | 1 | — | — | — |
| zinc powder | — | — | — | — | 35 | 35 | 35 | 35 |
| silica | 70 | 70 | 70 | 70 | 35 | 35 | 35 | 35 |
| Total | 100 | 100 | 100 | 100 | 100 | 100 | 100 | 100 |

The above components are dispersed through the process (5)* and then applied through the process (6)* to form a coat.

TABLE 14

| | (Compounding Proportions) | | | | | | | |
|---|---|---|---|---|---|---|---|---|
| | Sample | | | | | | | |
| Materials | A-2 | B-2 | C-2 | D-2 | A-3 | B-3 | C-3 | D-3 |
| modified resin (2)* | — | — | — | 30 | — | — | — | 30 |
| silicone resin | — | 30 | — | — | — | 30 | — | — |
| modified silicone resin (3)* | 29 | — | 30 | — | 29 | — | 30 | — |
| aluminium chelate (1)* | 1 | — | — | — | 1 | — | — | — |
| condensed aluminium phosphate | 8 | 8 | 8 | 8 | 8 | 8 | 8 | 8 |
| zinc molybdate | 8 | 8 | 8 | 8 | 8 | 8 | 8 | 8 |
| calcium carbonate | 8 | 8 | 8 | 8 | 8 | 8 | 8 | 8 |
| mica powder | — | — | — | — | 3 | 3 | 3 | 3 |
| talc | — | — | — | — | 3 | 3 | 3 | 3 |
| zinc powder | 35 | 35 | 35 | 35 | 35 | 35 | 35 | 35 |
| silica | 11 | 11 | 11 | 11 | 5 | 5 | 5 | 5 |
| Total | 100 | 100 | 100 | 100 | 100 | 100 | 100 | 100 |

TABLE 12

| | (Test-Results) | | | | |
|---|---|---|---|---|---|
| | Sample | | | | |
| Test Item | 6-1 | 6-2 | 6-3 | 6-4 | 6-5 |
| Heat-resisting adhesiveness (8)* | O | O | O | O | O |
| Heat-resisting rust-proofness (9)* | x | O | O | O | x |

The above components are dispersed through the process (5)* and then applied through the process (6)* to form a coat.

TABLE 15

| | Roughness Control | | Coat Performance Base Material Temperature | → → → → | Heat-resisting paint in the prior art | | Coat according to the present invention | |
|---|---|---|---|---|---|---|---|---|
| Test Number | Particle Shape ↓ | Particle Diameter | | | Rust-proofness Iron 350° C. | Adhesiveness Nickel-plated 650° C. | Rust-proofness Iron 350° C. | Adhesiveness Nickel-plated 650° C. |
| 8-1 | spherical | 0.5 mm | Low pressure treatment not performed | → | x | x | x | x |
| 8-2 | rectangular | 0.5 mm | Low pressure treatment not performed | → | x | x | x | x |
| 8-3 | rectangular | 0.5 mm | Low pressure treatment performed | → | x | x | O | x |
| 8-4 | spherical | 0.3 mm | Low pressure treatment not performed | → | x | x | O | x |
| 8-5 | rectangular | 0.2 mm | Low pressure treatment not performed | → | x | x | O | x |
| 8-6 | rectangular | 0.2 mm | Low pressure treatment performed | → | x | x | O | O |

TABLE 15-continued

|  | Roughness Control | | Coat | → | Heat-resisting paint in the prior art | | Coat according to the present invention | |
|---|---|---|---|---|---|---|---|---|
|  |  |  |  | → | Rust- | Adhesiveness | Rust- | Adhesiveness |
|  | Particle |  | Performance | → | proofness | Nickel- | proofness | Nickel- |
| Test | Shape | Particle | Base Material | → | Iron | plated | Iron | plated |
| Number | ↓ | Diameter | Temperature | → | 350° C. | 650° C. | 350° C. | 650° C. |
|  |  |  |  |  | Test Results | | | |

TABLE 16

(1)*aluminum chelate ethyl acetate aluminum di-isopropylate $$\begin{array}{c} H_7C_3O \diagdown_{Al} \diagup OC_3H_7 \\ O \qquad O \\ | \qquad \| \\ H_3C - C = C \diagdown_{C} \diagup C - OC_2H_5 \\ | \\ H \end{array}$$

| | |
|---|---|
| (2)*modified resin | epoxy resin (30%), acrylic resin (20%), phenol resin (30%), polyester resin (10%) (The numerals represent compounding proportions) |
| (3)*modified silicone resin | silicone resin (79%), modified resin (30%) |
| (4)*pulverized inorganic material | condensed aluminum phosphate (20%), zinc molybdate (15%), calcium carbonate (15%), zinc powder (40%), mica powder (2%), talc (2%), silica (5%) |
| (5)*process for dispersing a coating composition | The coating composition is dispersed through the steps of mixing the pulverized inorganic material into a resin solution in which the resin is resolved by an organic solvent, kneading the mixture by means of a ball mill, a triple roll, etc. until an average particle diameter becomes 1.5μ, and then dispersing the kneaded mixture into a solution. |
| (6)*process for coating | The organic solvent solution containing the coating composition is appropriately thinned by a thinner, and then it is coated by spraying. As the base material, a normal steel plate of 1 mm in thickness is employed, then it is subjected to sand blast or grit blast of 0.2 mm grits to an excessive extent, and the finished surface is painted with the solution. With regard to the thickness of the composition, it is finished into a thickness in the range of 10~20μ to form a lower layer, then a heat-resisting paint having the known composition consisting of 26.3 wt. % silicone resin, 28.1 wt. % metal oxides, 19.3 wt. % silica and 26.3 wt. % talc, is applied in a thickness of 10~30μ onto the lower layer to form an upper layer and then it is baked and dried at 180° C. for 30 minutes. |
| (7)*process for heating | The coats are heated respectively, with combinations of temperature and time of 150° C. × 200 Hours, 200° C. × 200 Hours, 250° C. × 200 Hours, 300° C. × 200 Hours, 350° C. × 200 Hours, 400° C. × 200 Hours, 450° C. × 200 Hours, 500° C. × 200 Hours, 550° C. × 200 Hours, 600° C. × 200 Hours and 650° C. × 200 Hours. |
| (8)*adhesiveness | On the surface of the painted film are formed 100 lattice lines at an interval of 1 mm having a depth reaching the base material with a cutter, an adhesive tape is attached onto the surface and it is suddenly peeled off. Determination: a number of lattice squares where more than ½ of a lattice square painted film is peeled off is counted, and if it is five or more the adhesiveness is determined to be no good, and the result is marked x. Whereas if it is fewer than 5 the adhesiveness is determined to be normal, and the result is marked O. |
| (9)*rust-proofness | On the surface of the painted film are formed cross-cuts reaching the base metal with a cutter, and spraying is carried out for 72 hours continuously by means of a JIS salt spray tester. Thereafter, the sample is taken out, moisture is dried at the room temperature, an adhesive tape is attached to the cut portion and then it is peeled off suddenly. Determination: when the peeled rust generated by the test is limited to within 2 mm on one side from the cut portion, the rust-proofness is determined to be normal, and the result is marked O, but when it exceeds the limit, the rust-proofness is determined to be no good, and the result is marked x. |

As known processes of roughness control practiced in the prior art, a shot blast process and a sand blast process have been known. On the metal surface obtained by practicing these processes are formed protrusions and recesses as shown in FIG. 3, but protrusions having "turn-rounds" as shown in FIG. 5 cannot be formed. Even if the latter protrusions should exist, the number of the protrusions is few and they are present only

| TABLE 16-continued |
|---|
| locally. Hence, the desired effect cannot be obtained. |

What is claimed is:

1. A heat-resistant coat applied onto a metal surface provided with fine protrusions having overhanging portions, said coat being composed of a lower layer and an upper layer, wherein said lower layer is formed from a coating composition comprising:

(a) 50-80% by weight of a pulverized inorganic material consisting essentially of (i) a mixture of powder particles consisting essentially of at least one compound selected from the group consisting of aluminum phosphate, zinc molybdate and calcium carbonate, (ii) plate-shaped powder particles consisting essentially of aluminum silicate or magnesium silicate, and (iii) metallic zinc powder, wherein the amount of the mixture of powder particles (i) is 20-55% by weight of the pulverized inorganic material, and the amount of metallic zinc powder is 40-70% by weight of the pulverized inorganic material; and (b) 20-50% by weight of a mixture of a modified silicone resin and an aluminum chelate compound selected from the group consisting of ethyl acetate aluminum di-isopropylate and aluminum tri-ethylacetoacetate, wherein the amount of aluminum chelate is 0.5-4% by weight of the mixture (b), and the modified silicone resin consists of 20-40% by weight of at least one resin selected from the group consisting of phenol resin, epoxy resin, acrylic resin and polyester resin and 80-60% by weight of a silicone resin;

said pulverized inorganic material (a) being bound by said mixture (b) of modified silicone resin and aluminum chelate compound; and wherein said upper layer is formed from a heat resistant coating composition consisting essentially of silicone resin and metal oxides.

2. A heat-resistant coat as claimed in claim 1, characterized in that said fine protrusions having overhanging portions are formed through the steps of blasting particles having corners and a diameter of 0.3 mm or less onto the metal surface with a strong pressure, and thereafter blasting spherical or rectangular particles having a diameter of 0.3 mm or less with a low pressure.

3. A heat-resisting coat as claimed in claim 1, characterized in that said modified silicone resin is prepared by compounding 20-40 weight % of at least one resin selected from the group consisting of phenol resin, epoxy resin, acrylic resin and polyester resin with silicone resin so as to amount to 100 weight % in total.

* * * * *